(12) United States Patent
Cho

(10) Patent No.: US 6,268,998 B1
(45) Date of Patent: Jul. 31, 2001

(54) LIQUID CRYSTAL DISPLAY MONITOR

(75) Inventor: Chang-Ho Cho, Inchon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/327,618

(22) Filed: Jun. 8, 1999

Related U.S. Application Data

(63) Continuation-in-part of application No. 08/919,252, filed on Aug. 28, 1997.

(30) Foreign Application Priority Data

Sep. 2, 1996 (KR) .................................................. 96-27912

(51) Int. Cl.[7] ....................................................... G06F 1/16
(52) U.S. Cl. ......................... 361/681; 361/379; 361/383; 361/386; 248/917; 248/918; 248/919; 248/920; 248/921; 248/922; 248/923
(58) Field of Search .................... 248/917, 918, 248/919, 921–923; 361/679, 681, 683, 686

(56) References Cited

U.S. PATENT DOCUMENTS

| 4,547,027 | 10/1985 | Scheibenreif . | |
|---|---|---|---|
| 4,781,347 | * 11/1988 | Dickie | .................................. 248/183 |
| 5,398,903 | * 3/1995 | Cho | ..................................... 248/349 |
| 5,583,743 | 12/1996 | Levins et al. . | |
| 5,587,876 | * 12/1996 | O'Brien et al. | ....................... 361/682 |
| 5,604,663 | 2/1997 | Shin et al. . | |
| 5,701,347 | 12/1997 | Daniels et al. . | |
| 5,729,430 | 3/1998 | Johnson . | |

\* cited by examiner

Primary Examiner—Leo P. Picard
Assistant Examiner—Yean-Hsi Chang
(74) Attorney, Agent, or Firm—Robert E. Bushnell, Esq.

(57) ABSTRACT

An LCD monitor includes a stand in which cable plugs are inserted through a recess in a bracket so as to be connected to connectors in the interior of the stand. In this way, the plugs are concealed from view, and are protected from tampering or damage. Moreover, during rotation or tilting of the monitor by the user, the plugs and their cables do not interfere with such rotation or tiling of the monitor by impact with any surface located behind the monitor. A printed circuit board (PCB) is supported on surface inside the stand, and the bracket is mounted on the outer frame of the stand and comprises a lower fitting panel, a top panel and side panels extending from the outer frame.

28 Claims, 5 Drawing Sheets

Fig. 1 *(Prior Art)*

LIQUID CRYSTAL DISPLAY MONITOR

CROSS-REFERENCE TO RELATED APPLICATIONS

This application is a continuation-in-part (CIP) of Ser. No. 08/919,252, entitled "LIQUID CRYSTAL DISPLAY MONITOR" filed on Aug. 28, 1997 in the U.S. Patent & Trademark Office, now abandoned.

CLAIM OF PRIORITY

This application makes reference to, incorporates the same herein, and claims all benefits accruing under 35 U.S.C. §119 and §120 from an application entitled LIQUID CRYSTAL DISPLAY MONITOR earlier filed in the Korean Industrial Property Office on Sep. 2, 1996, and there duly assigned Ser. No. 96-27912 by that Office.

BACKGROUND OF THE INVENTION

1. Field of the Invention

The present invention relates, in general, to display monitors. More particularly, the present invention relates to a display monitor with recessed cable connectors.

2. Description of the Prior Art

The information display industry continually is pursuing high quality display devices that are compact, thin and lightweight. Typical heavy and bulky CRT monitors (Cathode Ray Tube monitors) gradually have been replaced with light, compact LCD monitors (Liquid Crystal Display monitors). However compact display apparatuses may be, they often are encumbered with bulky cable attachments. A need exists for a compact display apparatus that diminishes the bulky appearance and mounting considerations associated with conventional connectors.

More particularly, as explained in more detail below, the design of prior monitors is such that the bulky cable attachments protrude to an excessive extent from the rear of the monitor. This means that the monitor or display unit cannot be placed as far back on a table or desk as the user would like. Thus, the available workspace in front of the monitor on the table or desk is limited, especially if a keyboard or other device is positioned in the workspace. Finally, the protruding cables at the rear of the monitor are not esthetic and can impact on the wall behind the monitor when the user attempts to rotate the monitor on its base. This can impede the user in rotating the monitor, and can damage the plugs and connectors.

Finally, in prior monitors, since liquid crystal displays (LCDs) are lighter than cathode ray tubes (CRTs), the prior monitors are more vulnerable to tipping over by inadvertent touch of the user.

SUMMARY OF THE INVENTION

The present invention overcomes the above-identified problems and provides an LCD monitor into which the cable connectors and the power and signal cable input jacks are recessed, preventing same from spoiling the overall appearance of the monitor and from interfering with placement of the monitor on a table or desk and rotation of the monitor on its base.

A first object of the invention is to provide an LCD monitor which may be placed on a support surface, proximate to a wall, thus being easily manipulable in limited space.

A second object of the invention is to provide a monitor which can be easily placed back from the front of a table or desk and toward the rear thereof, thereby freeing up workspace in front of the monitor.

A third object of the invention is to provide a monitor which can be placed proximate to a wall to the rear of the monitor without interfering with the user's ability to rotate the monitor on its base, i.e., without cables protruding from the rear of the monitor, and without impacting the wall during rotation of the monitor on its base, and damaging the plugs or connectors.

A fourth object of the invention is to reduce the tendency of LCDs to tip over due to inadvertent touch of the user by locating the speaker in the stand part below the monitor, thus lowering the center of gravity of, and stabilizing, the monitor.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

Similar reference characters denote corresponding features of the invention consistently throughout the attached drawings.

DESCRIPTION OF THE PREFERRED EMBODIMENTS

Figure 1:
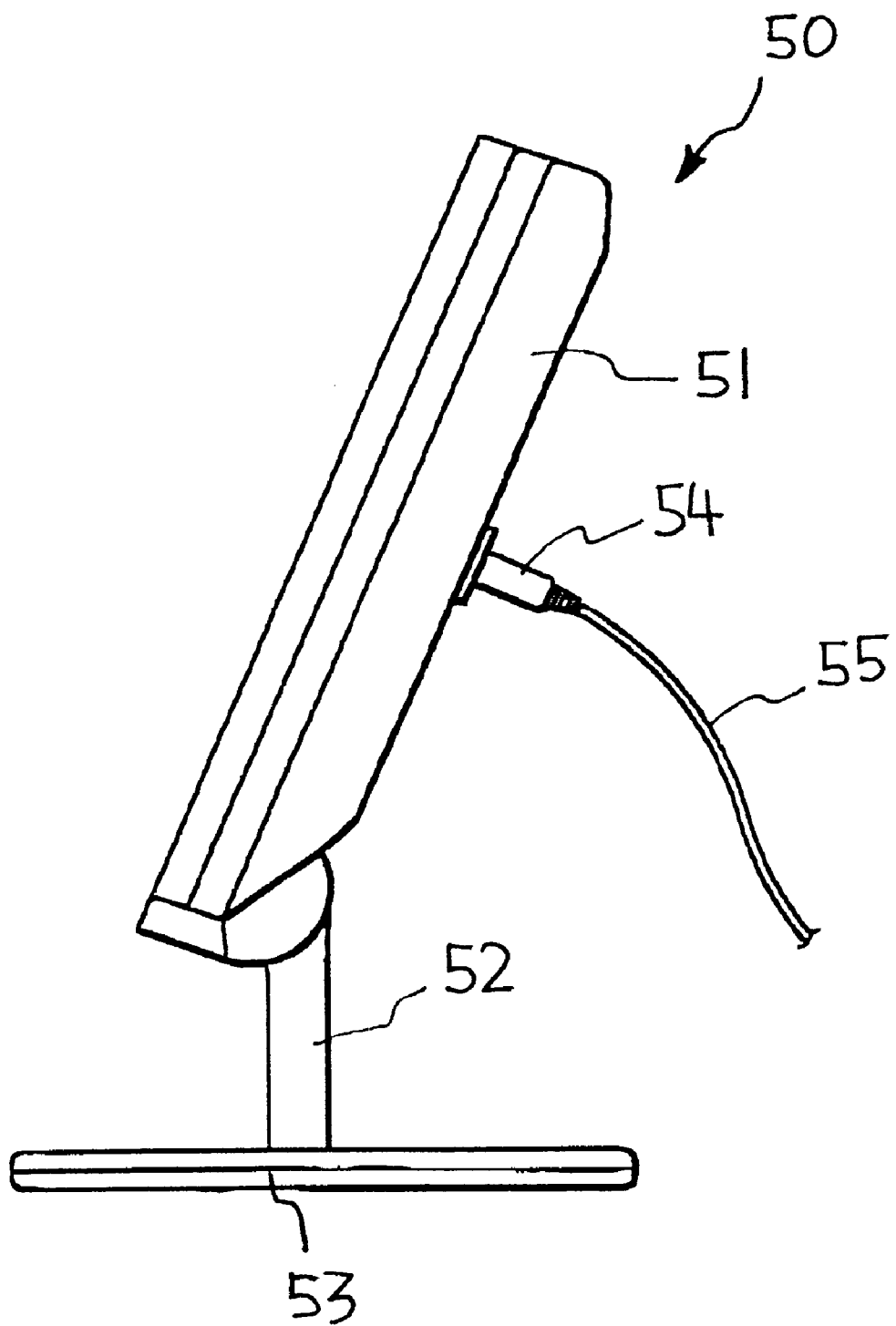
FIG. 1 is a side view of a prior display unit.

FIG. 1 is a side view of a prior display unit. As seen therein, the display unit 50 comprises a display part or display panel 51 attached to a shaft 52 mounted on a base 53. The shaft 52 can be fixed in the base 53 but, in more recent monitors, it is typical for the shaft 52 to be rotatable in the base 53 so that the user can rotate the display panel 51 about a vertical axis (perpendicular to base 53 and/or parallel to shaft 52) for ease of viewing.

As also seen in FIG. 1, a cable (or multiple cables) 55 extends from a connector 54 fixed to a rear face of the display panel 51. Such cable(s) can convey power and data signals to the display panel 51. However, as mentioned earlier, this design with its protruding connector 54 and cable 55 presents a non-esthetic appearance and interferes with the user's ability to rotate the display panel 51.

Figure 2:
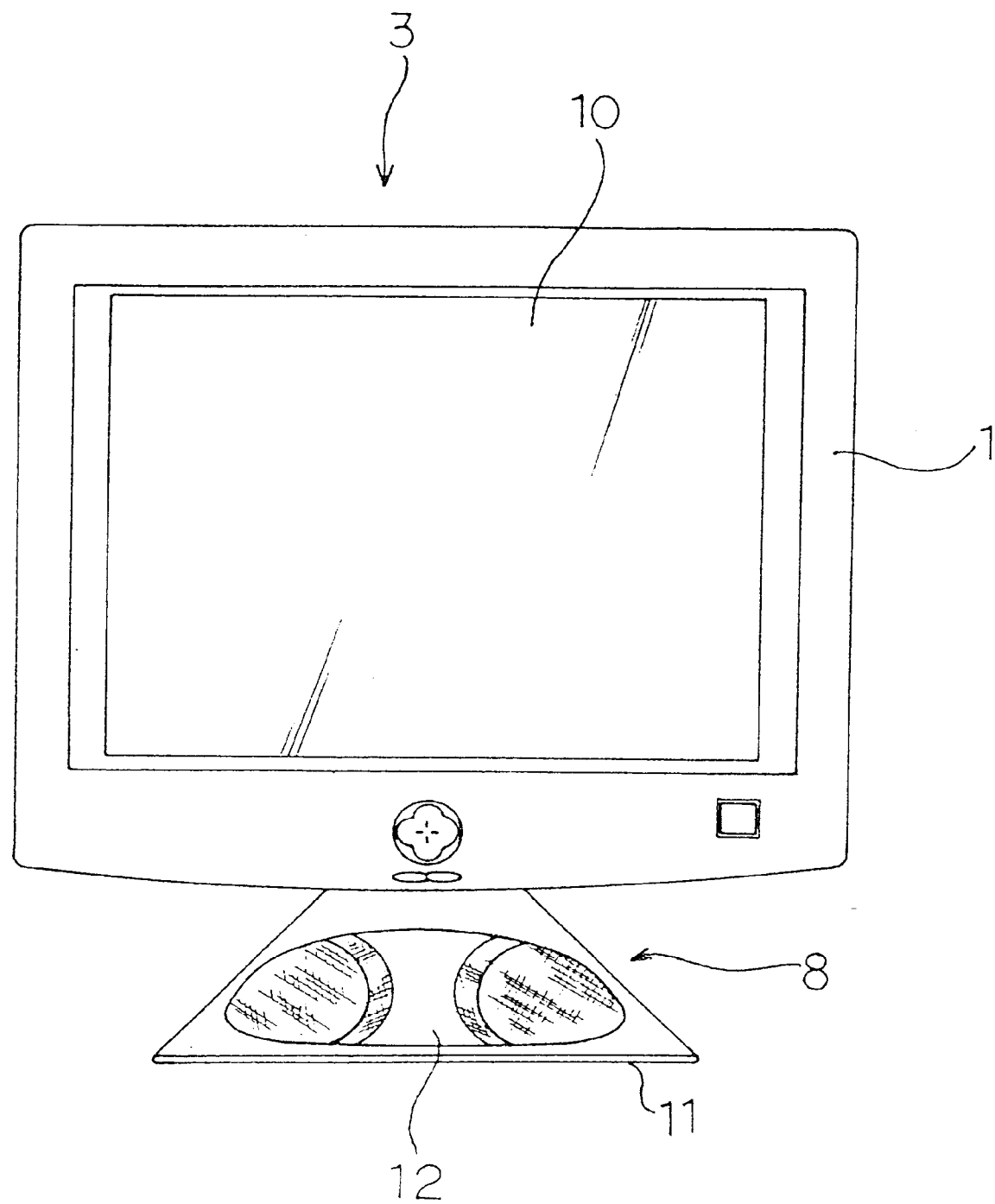
FIG. 2 is a front view of the LCD monitor of the present invention.
Figure 3:
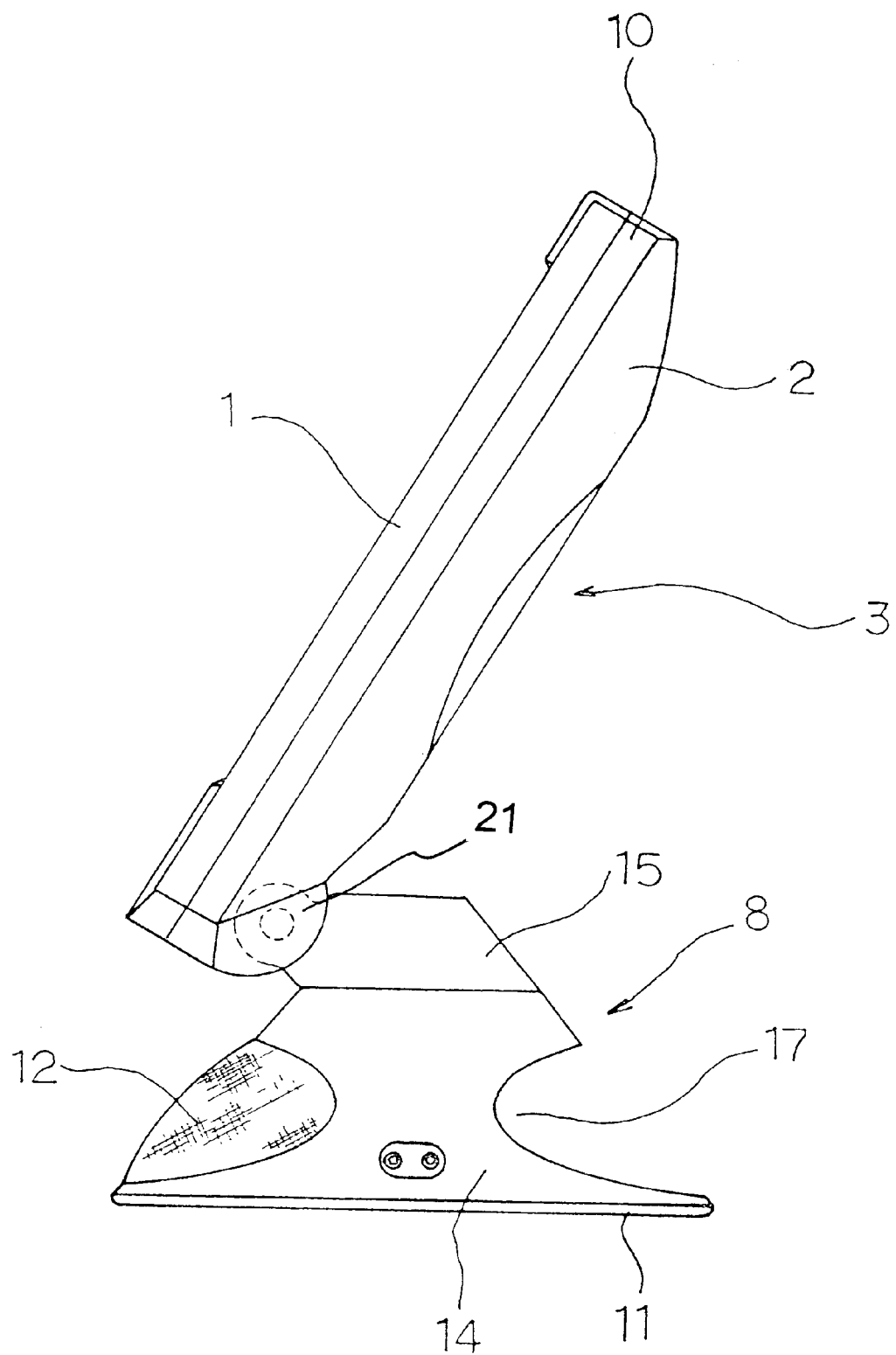
FIG. 3 is a side view of the LCD monitor of the present invention.
Figure 4:
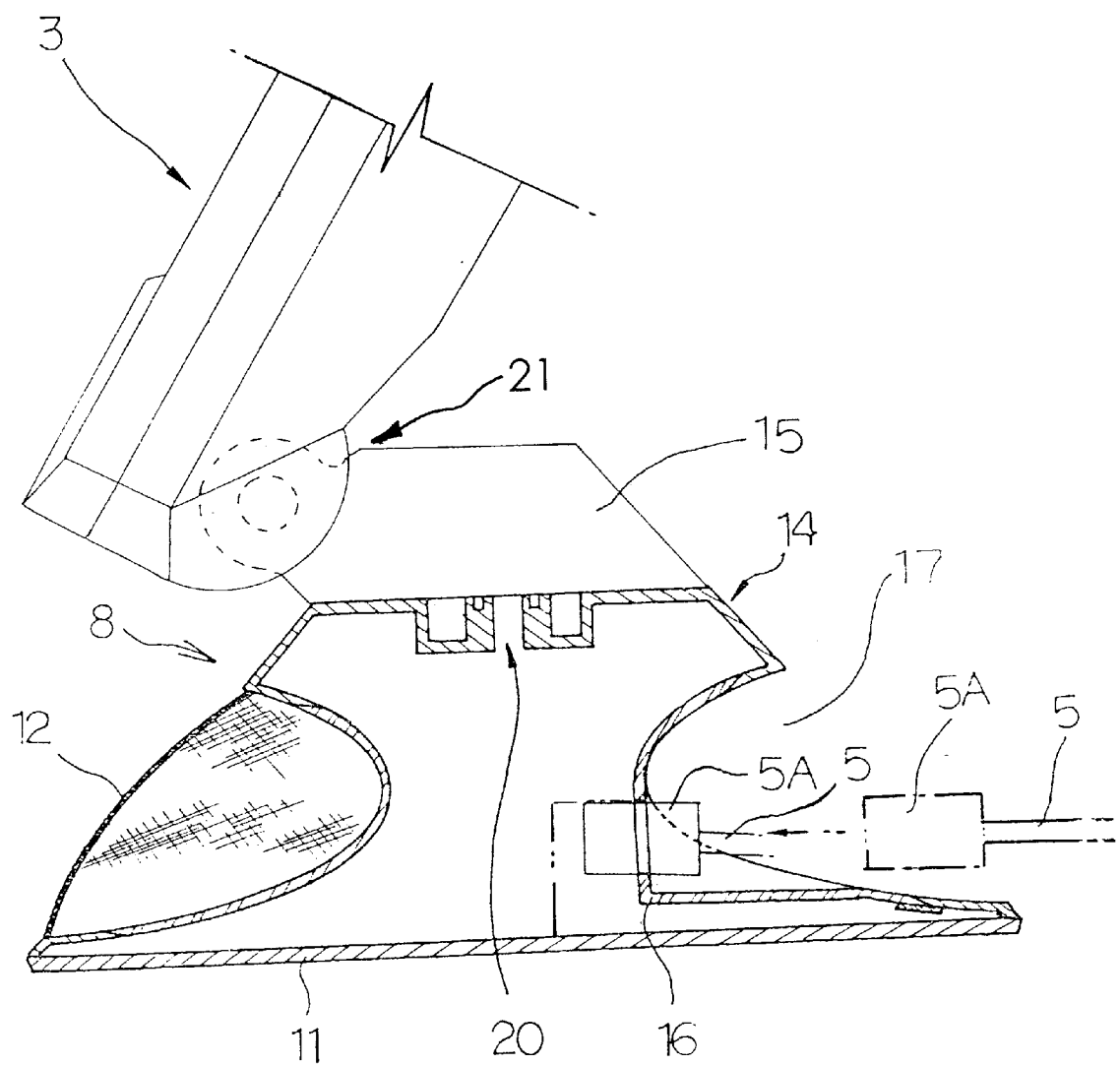
FIG. 4 is a sectional view of the LCD monitor of the present invention.
Figure 5:
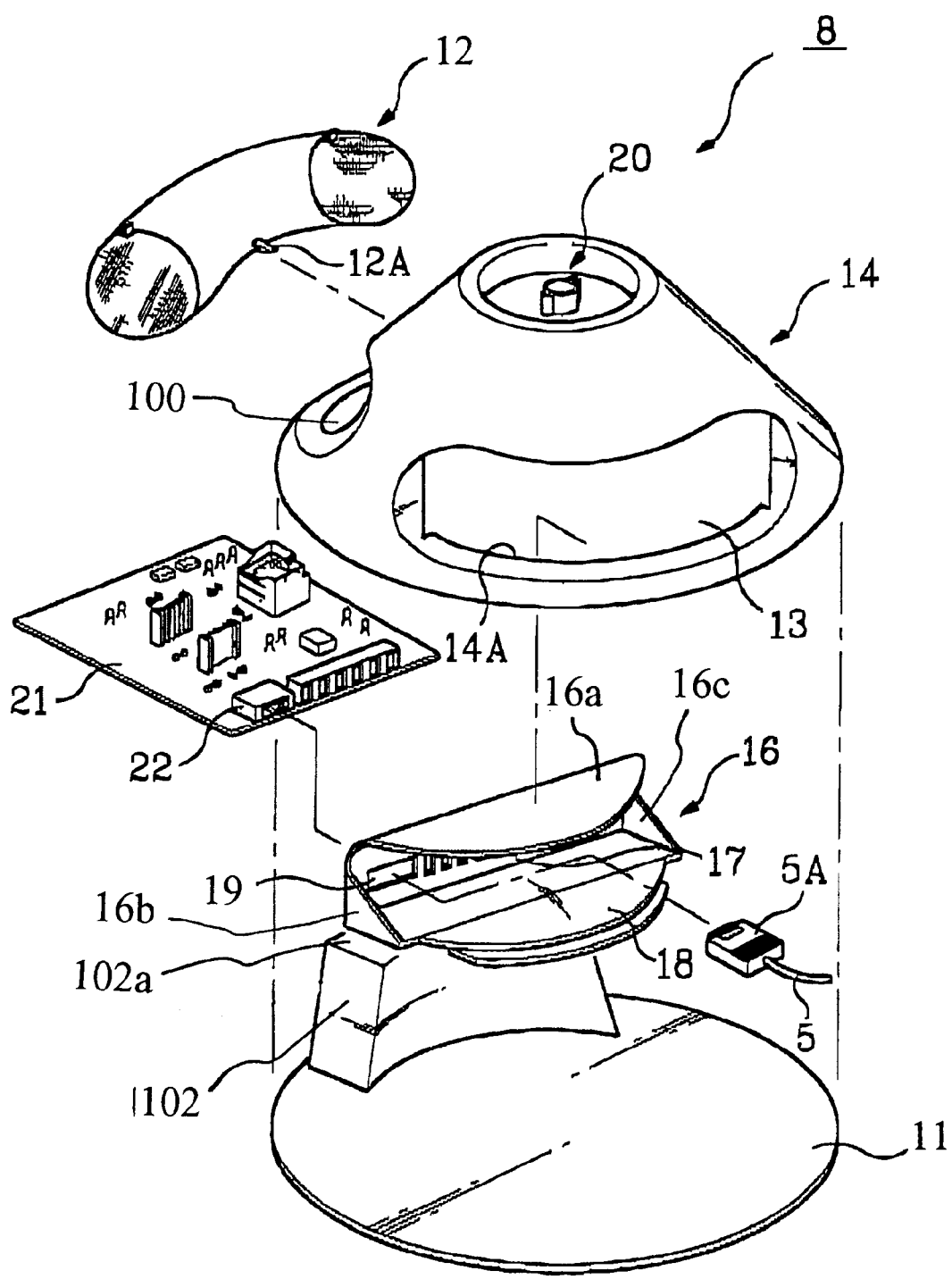
FIG. 5 is an exploded top right rear perspective view showing the LCD monitor of the present invention.

FIG. 2 is a front view of the LCD monitor of the present invention, FIG. 3 is a side view of the LCD monitor of the present invention, FIG. 4 is a sectional view of the LCD monitor of the present invention, and FIG. 5 is an exploded top right rear perspective view showing the LCD monitor of the present invention.

Referring to FIGS. 2 and 3, the monitor of the present invention has two parts: an LCD display part 3 and a stand part 8. Referring also to FIG. 3, the display part 3 has front and rear cases 1 and 2, respectively, combining to define a single casing, the LCD panel 10 being set in the front case 1 and a printed circuit board (PCB) (not shown in FIG. 3 but shown in FIG. 5) being set in the rear case 2.

Referring to FIGS. 3 and 4, the stand part 8 supports the display part 3 on a support surface (not shown). The stand part 8 includes connectors or junctions (not shown in FIGS. 3 and 4) which receive power and signal cables. The stand part 8 also has a tilting assembly 21, which allows the display part 3 to be tilted upward and downward, and a swivelling assembly 20, which allows the display part 3 to be tilted leftward or rightward, relative to the stand part 8.

The stand part 8 includes a circular base plate 11 which rests on a support surface (not shown), such as a table or desk surface. Referring to FIG. 5, a speaker grille 12 is detachably mounted on the top surface of the base plate 11 by a hook 12A, thus covering an aperture 100 in front of a speaker 102. A hollow conical frame 14 is mounted on top of the base plate 11, a cavity being defined by the frame 14 and base plate 11. The side wall of the conical frame 14 has an opening 13 which receives a plurality of cables, such as cable 5, prior to their being connected to connectors or sockets, such as connector 22, on printed circuit board (PCB) 23. The plurality of power cables can include power and signal cables.

Referring to FIG. 5, a bracket 16 having apertures 19 is mounted inside the opening 13. The apertures 19 receive and orient the plugs 5A prior to reaching the internally-mounted connectors 22. The bracket 16 defines a recess 17 leading to the interior cavity defined by frame 14 and base plate 11 so that the connectors may be positioned in the cavity concealed from view. This configuration hides the plugs 5A of the power or signal cables 5 within the stand part 8 when the plugs 5A are connected to connectors 22. A double layered fitting panel 18 is fitted over a fitting edge 14A of the frame 14 and extends from the inside to the outside, thus dismountably attaching the bracket 16 to the frame 14.

As further seen in FIG. 5, the PCB 23 is mounted on a support surface, such as that provided by the top surface 102A of speaker 102, so that the connectors 22 of PCB 23 are aligned with apertures 19 in bracket 16. However, it should be noted that another suitable surface can be located inside stand 8 to hold PCB 23 so long as proper alignment between connectors 22 and apertures 19 is achieved.

It should also be noted that bracket 16 has not only double layered fitting panel 18, but also a top panel 16A extending outward from apertures 19, and side panels 16B and 16C joining panels 16A and 18 and extending outward from apertures 19. In this way, apertures 19 are virtually concealed from view, and plugs 5A are absolutely concealed from view when inserted into connectors 22.

The present invention receives the power and signal cables, such as cable 5, so that they are concealed within the stand part 8, and are prevented from spoiling the appearance of the monitor. This recessing also permits the monitor to be placed on a support surface in close proximity to a wall. Thus, the LCD monitor of the present invention may be positioned easily in a limited space. In addition, the invention makes it possible for the user to rotate the display part 3 on its tilting assembly 21 (FIG. 4) and/or on its swivelling assembly 20 without interference or contact with a wall or other structure to the rear of the monitor. Finally, the connection of plug 5A to internal connector 22 (FIG. 5) cannot be tampered with, broken or damaged by use of the invention.

Although the preferred embodiments of the present invention have been disclosed for illustrative purposes, those skilled in the art will appreciate that various modifications, additions and substitutions are possible, without departing from the scope and spirit of the invention as claimed in the accompanying claims.

What is claimed is:

1. A flat panel display to which a terminal of at least one cable is connected in an unexposed manner, comprising:
   a display part having front and rear cases assembled into a single casing, said front case holding a flat display panel; and
   a stand part for supporting said display part and including an interior of said stand part for receiving said at least one cable and for connecting said terminal of said at least one cable to said flat panel display;
   wherein said stand part includes a bracket mounted in the interior of said stand part and a hollow frame disposed over and surrounding said bracket so as to conceal said bracket;
   wherein said bracket includes at least one aperture for receiving and guiding said terminal of said at least one cable, and said hollow frame has an outer surface which surrounds and conceals said interior of said stand part, said bracket mounted therein and said terminal disposed therein, said outer surface being discontinuous so as to form a recess therein, said at least one aperture and said recess being aligned for receiving said terminal of said at least one cable and for conveying said terminal to said interior of said stand part for connection to said flat panel display in an unexposed manner;
   wherein said bracket includes a double layered fitting panel adapted to be fitted over a fitting edge of said hollow frame.

2. The flat panel display of claim 1, wherein said at least one aperture is shaped so as to accept said terminal only when said terminal is inserted with a given orientation and to reject said terminal when said terminal is inserted with an orientation different from said given orientation.

3. The flat panel display of claim 2, wherein said hollow frame comprises a hollow conical frame.

4. The flat panel display of claim 1, wherein said hollow frame comprises a hollow conical frame.

5. The flat panel display of claim 4, further comprising a base plate on which said hollow conical frame is disposed.

6. The flat panel display of claim 1, wherein said stand part has a front portion which is discontinuous so as to form at least one aperture therein for receiving at least one speaker disposed therein.

7. The flat panel display of claim 6, further comprising at least one grille disposed on said front portion of said stand part for covering said at least one aperture and said at least one speaker disposed therein.

8. The flat panel display of claim 1, wherein said stand part has an upper portion, said upper portion including mounting means for rotatable mounting said display part.

9. The flat panel display of claim 8, wherein said mounting means comprises a swivelling assembly for rotating said display part to the left and right.

10. The flat panel display of claim 8, wherein said mounting means comprises a tilting assembly for tilting said display part up and down.

11. The flat display panel of claim 1, further comprising a printed circuit board having at least one connector and support means disposed inside said stand part for supporting said printed circuit board and for maintaining said at least one connector in alignment with said at least one aperture.

12. The flat display panel of claim 11, wherein said support means comprises a top surface of a speaker disposed inside said stand part.

13. The flat display panel of claim 1, wherein said bracket further comprises a top panel extending outward away from said hollow frame.

14. The flat display panel of claim 13, wherein said bracket further comprises side panels extending substantially vertically between said top panel and said double layered fitting panel.

15. A stand for a display unit to which a terminal of at least one cable is connected in an unexposed manner, comprising:

a base;

a bracket mounted in said stand and including at least one aperture for receiving and guiding said terminal of said at least one cable into an interior of said stand;

an outer frame disposed on said base, and over and surrounding said bracket, for surrounding and concealing said bracket and said terminal disposed in said interior of said stand; and wherein said outer frame surrounds and conceals said interior of said stand, said bracket mounted therein and said terminal disposed therein, and wherein said outer frame is discontinuous so as to form a recess therein, said at least one aperture of said bracket and said recess of said outer frame being aligned for receiving said terminal of said at least one cable and for conveying said terminal through said recess of the outer frame and through said at least one aperture in said bracket and to said interior of said stand for connection to said display unit in an unexposed manner;

wherein said bracket includes a double layered fitting panel adapted to be fitted over a fitting edge of said outer frame.

16. The stand of claim 15, wherein said at least one aperture is shaped so as to accept said terminal only when said terminal is inserted with a given orientation and to reject said terminal when said terminal is inserted with an orientation different from said given orientation.

17. The stand of claim 16, wherein said outer frame comprises a hollow conical frame disposed over said bracket so as to conceal said bracket.

18. The stand of claim 15, wherein said outer frame comprises a hollow conical frame.

19. The stand of claim 18, further comprising a base plate on which said hollow conical frame is disposed.

20. The stand of claim 15, wherein said outer frame has a front portion which is discontinuous so as to form at least one aperture for receiving at least one speaker disposed therein.

21. The stand of claim 20, further comprising at least one grille disposed on said front portion of said outer frame for covering said at least one aperture and said at least one speaker disposed therein.

22. The stand of claim 15, wherein said outer frame has an upper portion, said stand further comprising mounting means for rotatably mounting said display unit on said stand.

23. The stand of claim 22, wherein said mounting means comprises a swivelling assembly for rotating said display unit to the left and to the right.

24. The stand of claim 22, wherein said mounting means comprises a tilting assembly for tilting said display unit up and down.

25. The stand of claim 15, further comprising a printed circuit board having at least one connector and support means disposed inside said stand for supporting said printed circuit board and for maintaining said at least one connector in alignment with said at least one aperture.

26. The stand of claim 25, wherein said support means comprises a top surface of a speaker disposed inside said stand.

27. The stand of claim 15, wherein said bracket further comprises a top panel extending outward away from said outer frame.

28. The stand of claim 27, wherein said bracket further comprises side panels extending substantially vertically between said top panel and said double layered fitting panel.

* * * * *